(12) United States Patent
Smits

(10) Patent No.: US 8,189,881 B1
(45) Date of Patent: May 29, 2012

(54) FINGERPRINT SENSOR USING BEAMS OF LIGHT AND METHODS OF MANUFACTURE AND USE

(75) Inventor: Gerard Dirk Smits, Los Gatos, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1218 days.

(21) Appl. No.: 11/945,944

(22) Filed: Nov. 27, 2007

(51) Int. Cl.
*G06K 9/00* (2006.01)

(52) U.S. Cl. ...... 382/124; 340/5.53; 340/5.83; 713/186; 902/3

(58) Field of Classification Search .......... 382/124–127; 283/68, 69, 78; 340/5.1, 5.2, 5.52, 5.53, 340/5.8–5.86; 356/71; 713/186; 902/3
See application file for complete search history.

(56) References Cited

U.S. PATENT DOCUMENTS

| | | | | |
|---|---|---|---|---|
| 5,732,148 A | * | 3/1998 | Keagy et al. | 382/124 |
| 5,796,858 A | * | 8/1998 | Zhou et al. | 382/127 |
| 7,116,805 B2 | * | 10/2006 | Machida | 382/124 |
| 7,158,659 B2 | * | 1/2007 | Baharav et al. | 382/124 |
| 7,164,782 B2 | * | 1/2007 | Baharav et al. | 382/124 |
| 7,853,055 B2 | * | 12/2010 | Machida | 382/124 |
| 2003/0002717 A1 | * | 1/2003 | Hamid | 382/124 |
| 2004/0208346 A1 | * | 10/2004 | Baharav et al. | 382/124 |
| 2008/0075339 A1 | * | 3/2008 | Haddad | 382/124 |
| 2009/0067690 A1 | * | 3/2009 | Mainguet | 382/124 |

* cited by examiner

*Primary Examiner* — Aaron W Carter
(74) *Attorney, Agent, or Firm* — Wade J. Brady, III; Frederick J. Telecky, Jr.

(57) ABSTRACT

A fingerprint sensor uses beams of light to detect a fingerprint as the finger is swiped over a ridged surface. The beams of light are directed toward individual regions of the ridged surface so that the light beams will generally be totally internally reflected when a finger is not touching the ridge. The total internal reflection characteristics of the ridged surface are altered at regions touched by the ridges on the finger as the finger is swiped over the sensor. This alters the amount of light reflected by the ridged surface. These changes in light reflection as the finger is swiped over the ridged surface can be observed simultaneously over multiple channels, preferably disposed laterally with respect to each other, to provide a fingerprint.

22 Claims, 7 Drawing Sheets

FINGERPRINT SENSOR USING BEAMS OF LIGHT AND METHODS OF MANUFACTURE AND USE

BACKGROUND OF THE INVENTION

Electronic fingerprint sensors have been used in the past to provide, for example, secure access to locations or to devices such as computers, cars, and the like. At least some of these sensors utilize a change in the electronic characteristics (e.g., capacitance) df a sensor array as the finger is swiped past the sensor. One difficulty with these sensors is that they can generate electromagnetic interference (EMI) or stray radio frequency (RF) signals that may be detrimental to devices in which the fingerprint sensor might be used, such as with computers, GPS receivers, mobile telephones, or personal data assistants (PDAs), where the fingerprint sensor might be used as a theft prevention or data protection device.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
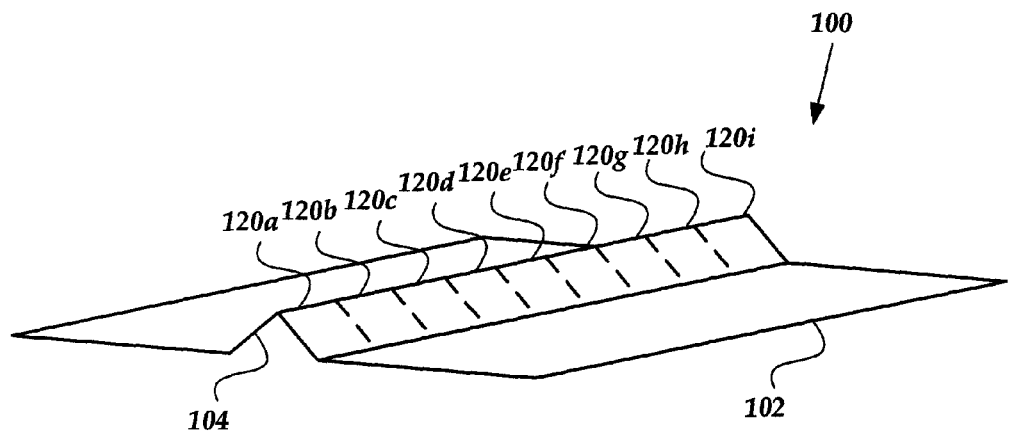
FIG. 1 is a schematic perspective view of one embodiment of a ridged surface for use with a fingerprint sensor, according to the invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct connection between the items connected, or an indirect connection through one or more passive or active intermediary devices.

The present invention is directed to a fingerprint sensor that uses beams of light to detect a fingerprint as the finger is swiped over a ridged surface, and methods of manufacture and use of the sensor, as well as devices that incorporate the sensor. In at least some embodiments, beams of light are directed toward individual regions of the ridged surface so that the light beams will generally be totally internally reflected when a finger is not touching the ridge. The total internal reflection characteristics of the ridged surface are altered at regions touched by the ridges on the finger as the finger is swiped over the sensor. This alters the amount of light reflected by the ridged surface. These changes in light reflection as the finger is swiped over the ridged surface can be observed simultaneously over multiple channels, preferably disposed laterally with respect to each other, to provide a fingerprint.

Figure 2A:
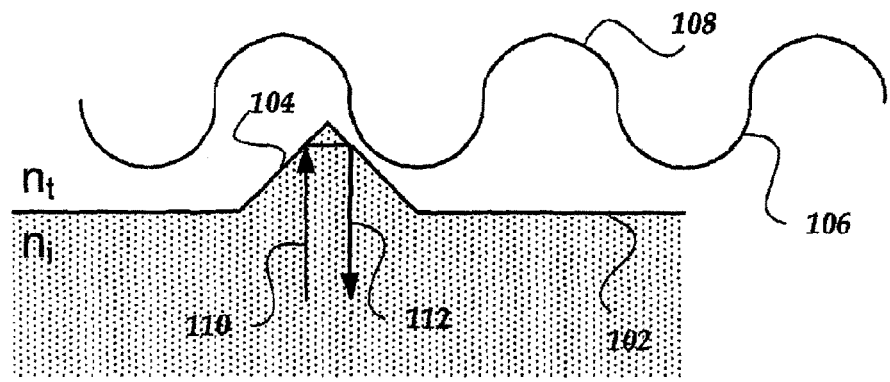
FIG. 2A is a schematic cross-sectional view of the ridged surface of FIG. 1 to illustrate operation of the fingerprint sensor, according to the invention.
Figure 2B:
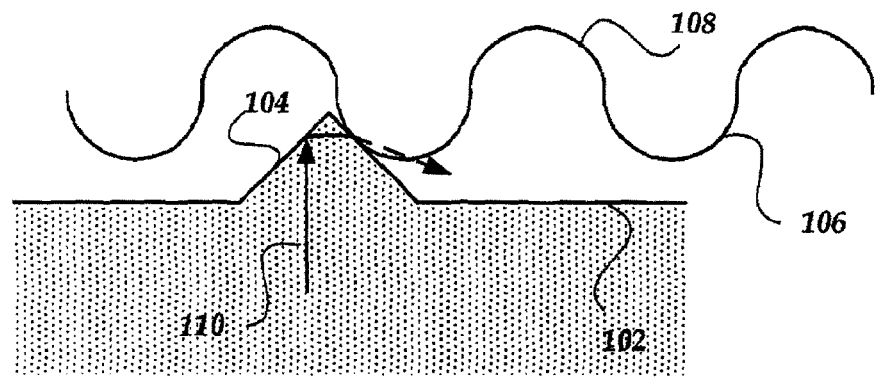
FIG. 2B is a second schematic cross-sectional view of the ridged surface of FIG. 1 to illustrate operation of the fingerprint sensor, according to the invention.

Typically, the fingerprint sensor will include at least 10, 20, 30, 40, 50, 60, 70, 80, 90, 100, 125, 150, 200, 250, or more channels to obtain a fingerprint. In at least some embodiments, these channels are arranged laterally or side-by-side. FIG. 1 illustrates a portion of one embodiment of a fingerprint sensor 100 with a ridged surface 102 having a prism-like structure 104 with multiple channels 120a, 120b, . . . 120i. It will be understood that this embodiment can be made with any number of channels. The channels may be, at least in part, physically separated or they may be side-by-side with no obvious separation. To illustrate individual operation of each channel, FIGS. 2A and 2B are cross-sectional views of a channel of the fingerprint sensor 100 with the ridged surface 102 having the prism-like feature 104. A finger with ridges 106 and grooves 108 is swiped against the sensor 100 as illustrated in FIGS. 2A and 2B. A light signal 110 is directed toward the prism-like feature 104 on the ridged surface 102. In at least some embodiments, the light signal 110 is collimated to prevent or reduce cross-talk with other channels from light that may cross into, or be reflected into, another channel. The light signal 110 may be continuous or modulated at any suitable frequency.

The materials of the sensor can be selected so that, in the absence of a finger, the light is substantially reflected back from the prism-like feature 104 towards a detector for the channel. Preferably, the material of the sensor and the angle of incidence of the light signal 110 is selected so that when air is present across the sensor interface the light will be totally internally reflected (minus a minor amount lost due to scattering, absorption, or other effects) to provide a reflection light signal 112 as illustrated in FIG. 2A. In at least some embodiments, the index of refraction of the material of the sensor is sufficiently high with respect to air so that a substantial amount (at least 10%, 25%, 50%, 75%, 90%, 95% or 99%) of light impinging on the feature of the ridged surface will be totally internally reflected. Light can be totally internally reflected when the light approaches an interface between two materials at an angle that is equal to or greater than the critical angle, $\theta_c$, wherein $\sin(\theta_c)=n_t/n_i$, where $n_i$ is the index of refraction of the material that the light is traveling through to reach the interface and $n_t$ is the index of refraction of the material on the other side of the interface, as illustrated in FIG. 2A. The angle is measured relative to a line extending orthogonally from the interface.

When a portion of the finger (such as a ridge 106) touches the prism-like feature 104, the reflection characteristics at the interface where the finger touches are changed and at least a portion of the light signal 110 will not be totally internally reflected (due to the change in the index of refraction at the interface) as illustrated, for example, in FIG. 2B. This portion of the light may be, for example, transmitted, absorbed, reflected in another direction, or any combination of these. By observing the change in reflection of the light signal 110 over time, as measured from the intensity of the reflection light signal 112, as the finger is swiped over the prism-like feature 104, a print for the portion of the finger corresponding to the channel can be obtained. Using multiple channels, the entire fingerprint (or any desired portion of the fingerprint) can be obtained.

Typically, the detector for each channel will measure the reflected light signal for discrete time periods during the swiping of the finger to provide a series of datapoints for each channel. Generally, the shorter each time period is, the higher the resolution of the resulting fingerprint; although it will be recognized that the shorter the time period, the more influence noise will have on the resulting data. Modulation of the light, for example, may be used to define a suitable detection time period.

Moreover, the relative amount of reflected light can be resolved into any number of intensity levels (e.g., two, three, four, five, six, eight, ten, twelve, or more different levels of reflected light). For example, a two level system would only determine whether the amount (e.g., intensity) of reflected light exceeds a particular threshold level. If the intensity of the reflected light exceeds the threshold then a groove is detected and if the intensity of the reflected light does not exceed the threshold then a ridge is detected. This provides one bit of information per datapoint. As another example, a four level system would determine whether the intensity of the reflected light exceeds a first, second, or third threshold level; thereby providing two bits of information per datapoint. Generally, the larger the number of resolved intensity levels, the more information in the resulting signal; although it will be recognized that the larger the number of resolved intensity levels, the more influence noise will have on the resulting data. The fingerprint may even be converted into an image incorporating all of the datapoints from each of the channels.

Figure 3:
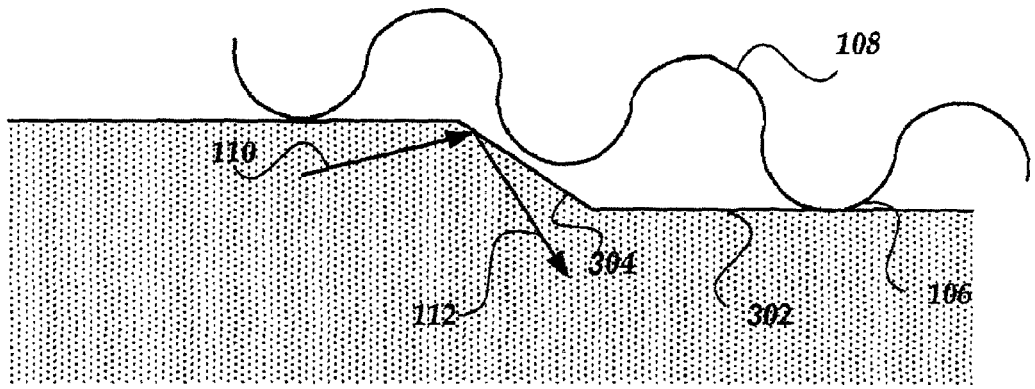
FIG. 3 is a schematic cross-sectional view of another embodiment of a ridged surface of a fingerprint sensor, according to the invention.

It will be recognized that features other than a prism-like feature can be used in a fingerprint sensor. FIG. 3 is a cross-sectional view of one embodiment of a fingerprint sensor with a bevel-like feature 304 on a ridged surface 302.

Figure 4:
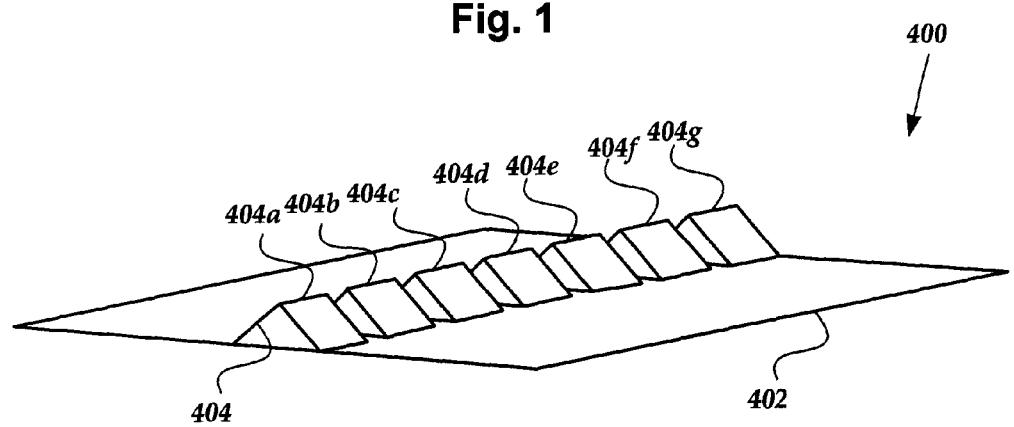
FIG. 4 is a schematic perspective view of a third embodiment of a ridged surface for use with a fingerprint sensor, according to the invention.
Figure 5:
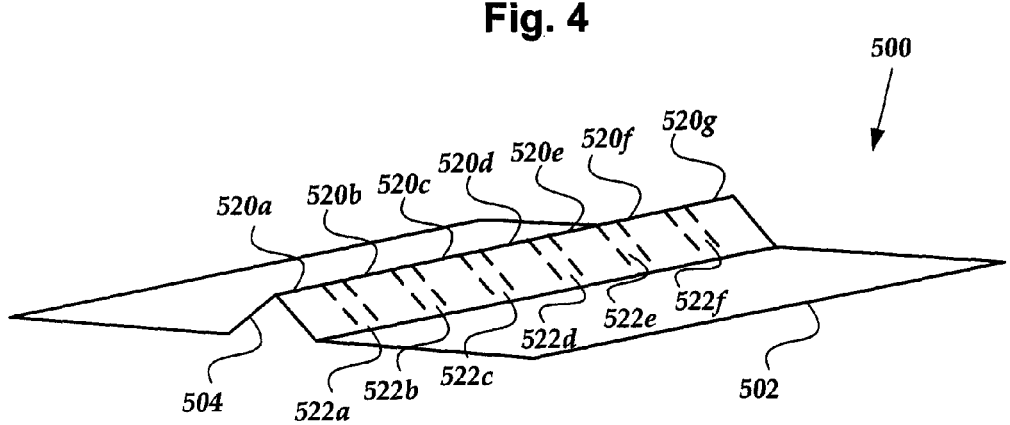
FIG. 5 is a schematic perspective view of a fourth embodiment of a ridged surface for use with a fingerprint sensor, according to the invention.

FIG. 4 illustrates a portion of another embodiment of a fingerprint sensor 400 with a ridged surface 402 having an individual prism-like feature 404a, 404b, . . . , 404g for each channel. FIG. 5 illustrates a portion of another embodiment of a fingerprint sensor 500 with a ridged surface 502 with a prism-like feature 504 where each channel 520a, 520b, . . . , 520g is separated from adjacent channels by a spacer 522a, 522b, . . . , 522f. The spacer feature may be the same material as the channel or the spacer feature may contain material that reflects or absorbs the light from the channel that impinges on the spacer feature to reduce or prevent cross-talk between channels.

Figure 6:
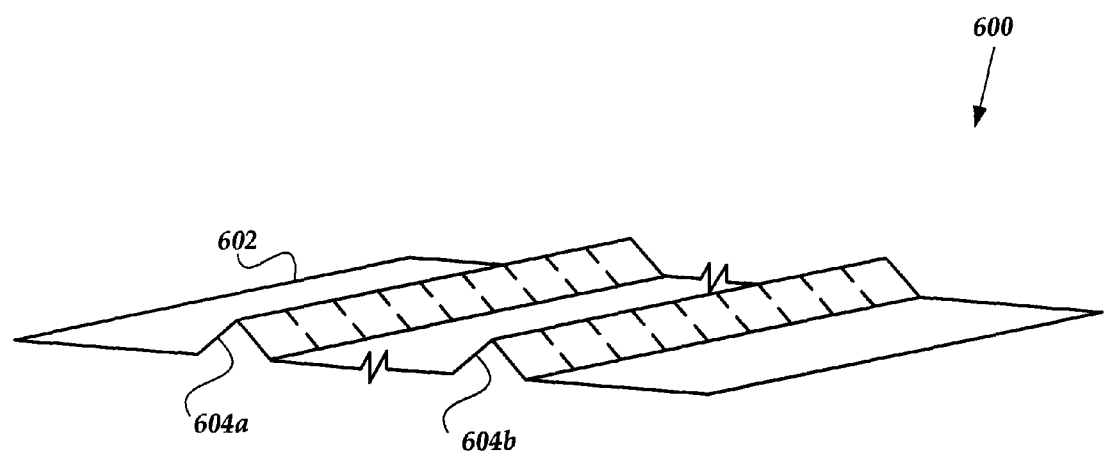
FIG. 6 is a schematic perspective view of a fifth embodiment of a ridged surface for use with a fingerprint sensor, according to the invention.

FIG. 6 illustrates another embodiment of a fingerprint sensor 600 with a ridged surface 602 having two prism-like features 604a, 604b that are spaced apart longitudinally. It will be recognized that other embodiments may include more than two prism-like features and that the prism-like or bevel-like features of any of the embodiments described above can be used instead of those illustrated in FIG. 6. Each prism-like feature 604a, 604b can support multiple channels. This particular arrangement may be useful to determine swipe speed by comparing the fingerprints identified using each feature separately. In at least some embodiments, one prism-like feature has fewer channels than the other because the determination of swipe speed could be made using a single channel or even multiple channels (but less than the full number of channels used to obtain the fingerprint).

Figure 7:
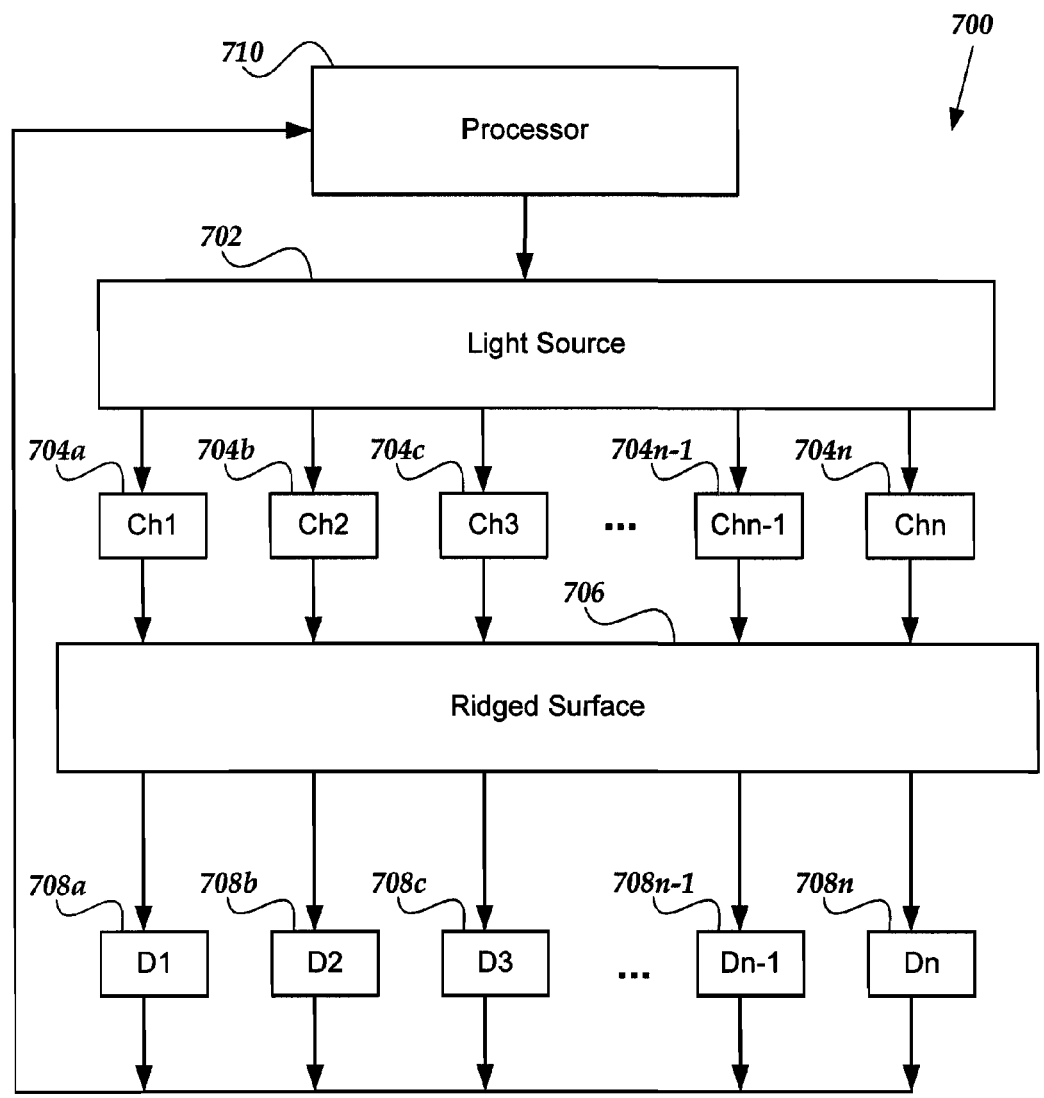
FIG. 7 is a schematic block diagram of one embodiment of a fingerprint sensor, according to the invention.

FIG. 7 is a block diagram of one embodiment of a fingerprint sensor 700. The sensor 700 includes at least one light source 702 that provides light to n channels 704a, 704b, 704c, . . . , 704n-1, 704n. Each channel delivers the light to the ridged surface 706 where the light is reflected, depending upon the position of the finger, back to detectors 708a, 708b, 708c, . . . , 708n-1, 708n. The detectors 708 provide the detected signals to the processor 710.

Any suitable processor can be used and the processor may include one or more subprocessors. The processor accumulates the datapoints for each channel to produce the fingerprint. In some embodiments, the fingerprint may be stored for comparison later with another fingerprint. In some embodiments, the processor may compare the fingerprint (or the datapoints that form the fingerprint) with a stored fingerprint to determine, within a desired level of certainty, whether the two fingerprints are the same.

Any suitable light source can be used. A light source may be provided for each channel or two or more channels may receive light from the same light source. In some embodiments, a single light source may provide light to all of the channels. Examples of suitable light sources include, but are not limited to, light emitting diodes (LEDs), lamps, lasers, vertical cavity surface-emitting lasers (VCSELs), LED light bars, and the like. Preferably, the light from the light source is collimated to prevent or reduce cross-talk between channels. Alternatively or additionally, the sensor may include waveguides or optical fibers to deliver the light for each channel.

The light source can generate monochromatic or polychromatic light. The light may have any suitable wavelength or wavelengths including any wavelength(s) in the visible, infrared, or ultraviolet regions of the spectrum. In one embodiment, the light is visible light so that a user can know when the fingerprint sensor is operational or operating.

Any suitable detector can be used. A detector may be provided for each channel or the same detector (e.g., an array detector) may be used for two or more channels. In some embodiments, a single array detector may be used to detect the light of all the channels. Examples of suitable detectors include, but are not limited to, photodiodes, photomultipliers, charge-coupled devices (CCD), CMOS detectors, and the like. The detector can be an array of detectors, such as, for example, a CMOS or CCD array or array of photodiodes or photomultipliers.

Figure 8:
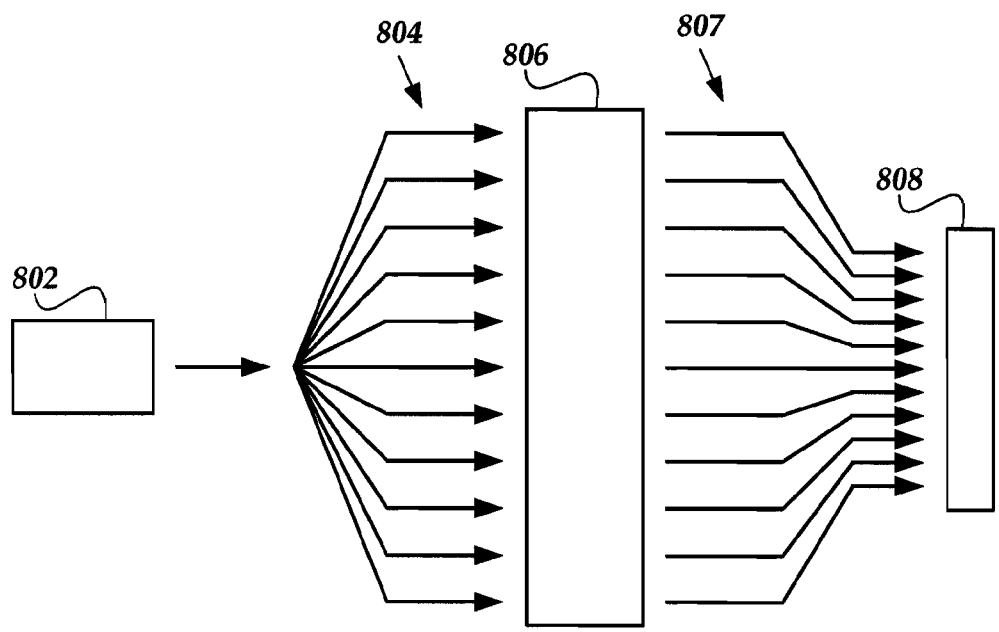
FIG. 8 is a schematic block diagram of another embodiment of a fingerprint sensor, according to the invention.

FIG. 8 illustrates, in diagrammatic form, one embodiment of a fingerprint sensor with at least one light source 802, multiple delivery channels 804, a ridged surface 806, multiple reflection channels 807, and at least one detector 808. The light source(s) 802 provide(s) light to the delivery channels 804. Preferably, the delivered light is pulsed. The delivery channels 804 could be, for example, an array of waveguides that provide light to different regions of the ridged surface 806. A useful array of waveguides can be made with center-to-center distances in the range of, for example, 10 μm (or smaller) to 1 mm (or larger) or in the range of 25 to 500 μm or in the range of 40 to 200 μm. Light encounters the ridged surface 806, as described above, and may be reflected back toward the reflection channels 807 and detector 808. Again, the reflection channels 807 may correspond to an array of waveguides. In one embodiment, the waveguides in an array of delivery channels 804 correspond in a one-to-one fashion with waveguides in an array of reflection channels 807. In other embodiments, the number of waveguides in each array of channels can be different. In at least some embodiments, the detector 808 is an array of detection elements and may include the same number of detection elements as the number of waveguides in the array that forms the multiple reflection channels 807. It will be understood that the detector 808 may include more or fewer detection elements than the number of reflection channels 807.

Figure 9:
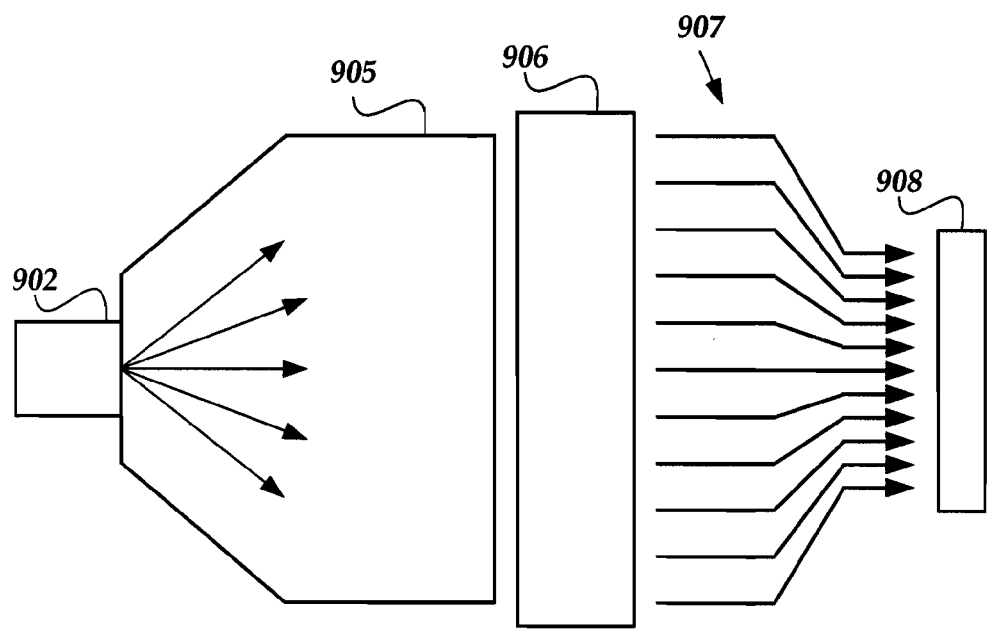
FIG. 9 is a schematic block diagram of a third embodiment of a fingerprint sensor, according to the invention.

FIG. 9 illustrates another embodiment of a fingerprint sensor with at least one light source 902, a light guiding element 905, a ridged surface 906, multiple reflection channels 907, and at least one detector 908. In this particular embodiment, the light is delivered to the ridged surface 906 through a light guiding element 905 with the light spreading from the light source 902 through the light guiding element 905. Preferably, the multiple reflection channels 907 correspond to an array of waveguides (or the like) disposed near the ridged surface 906 so that light reflected at each particular region on the surface 906 will be collected by a particular corresponding waveguide. Generally, the closer the ends of the waveguides are positioned to the surface 906 the less reflected light from other regions of the ridged surface 906 will enter the waveguide.

Figure 10:
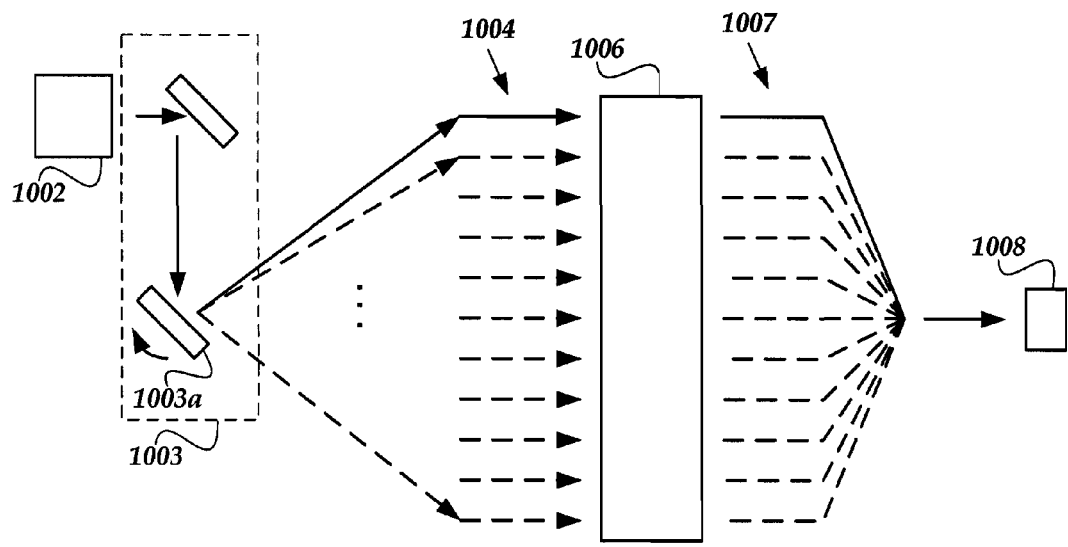
FIG. 10 is a schematic block diagram of a fourth embodiment of a fingerprint sensor, according to the invention.

FIG. 10 illustrates yet another embodiment of a fingerprint sensor with a light source 1002, a light direction arrangement 1003, multiple delivery channels 1004, a ridged surface 1006, multiple light reflection channels 1007, and a single detection element 1008. In this embodiment, the light direction arrangement 1003 directs the light from the light source 1002 through the individual delivery channels 1004 using, for example, a rotating mirror 1003a, prism, Fresnel faceted element, or any other suitable device that can be used to selectively deliver light to any of the channels. The single detection element 1008 detects the reflected light 1008 for each of the channels individually. It will be understood that in other similar embodiments, the light may sequentially illuminate multiple channels (e.g., 2, 3, 4, 5, 10, 20, or more channels) and the detector may include multiple detection elements. This allows the device to be built with fewer detection elements or with a light source that requires lower power. As an alternative to using individual light guides for the reflection channels, the device may include a lens that focuses light from the ridged surface to the detector. Because only a portion of the ridged surface is illuminated at any given time, the corresponding detected light can be identified with a particular part of the fingerprint.

Figure 11:
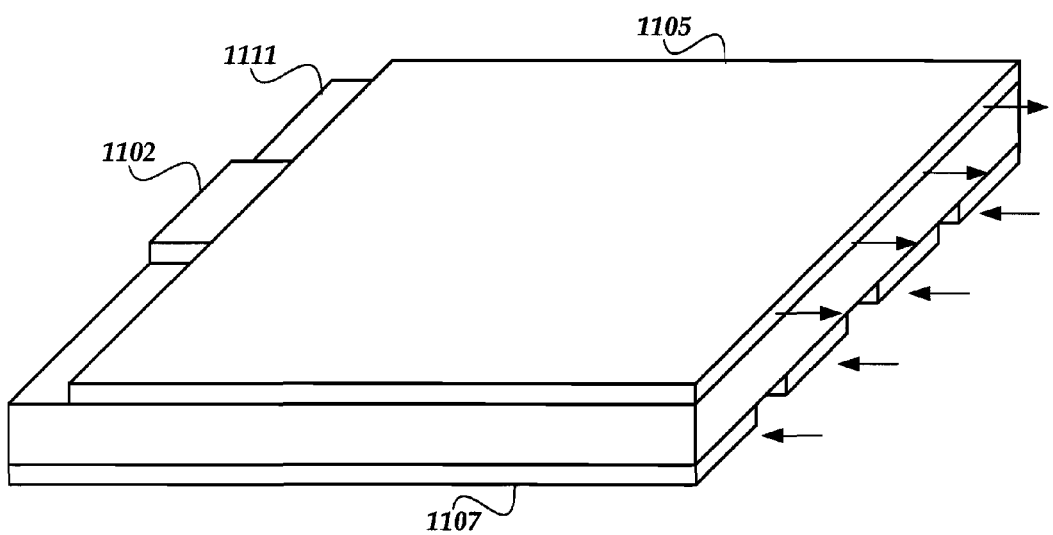
FIG. 11 is a schematic perspective view of a structure that combines both a light delivery element and reflection channels, according to the invention.

FIG. 11 illustrates one embodiment of a structure that includes both a light delivery element 1105 and multiple detection channels 1107 on a substrate 1111. The structure optionally includes the light source(s) 1102. The substrate 1111 will typically have a relatively low index of refraction with the light delivery element 1105 and detection channels 1107 having a relatively high index of refraction to provide for transportation of the light through the light delivery element 1105 and detection channels 1107. Light is emitted toward a ridged surface (not shown) from the light delivery element 1105 and reflected back from the ridged surface toward the detection channels 1107, as indicated by the arrows in FIG. 11. Alternatively, the light delivery element 1105 may include individual patterned channels similar to the detection channels.

Figure 12A:
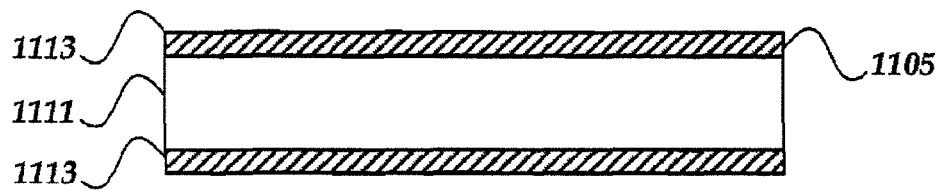
FIGS. 12A to 12C illustrate, in schematic cross-sectional views, steps in one method of forming the structure of FIG. 11.
Figure 12B:
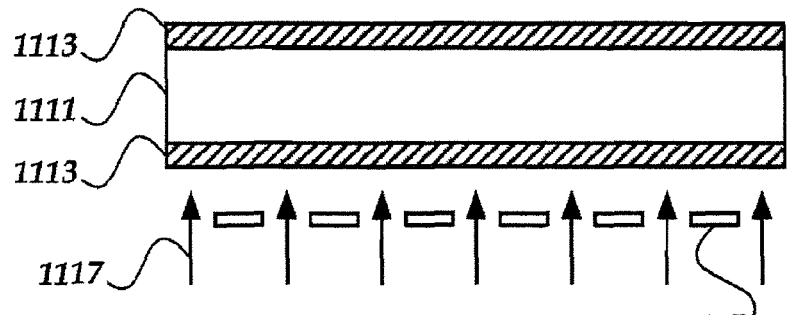
Figure 12C:
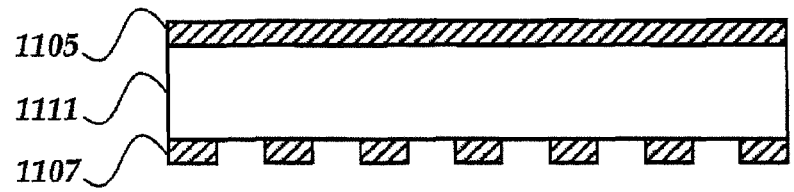

FIGS. 12A-12C illustrate one method for making the structure of FIG. 11. In this method, the layers of high index material 1113 can be disposed on the substrate 1111 using any suitable method including, for example, dip coating, spin coating, curtain coating, extrusion, deposition, and the like, as illustrated in FIG. 12A. One of the layers can be lithographically patterned using a mask 1115 and light 1117, as illustrated in FIG. 12B. For example, the material may be a material that is cross-linked or polymerized when exposed to light. The unexposed material can be removed, as illustrated in FIG. 12C, leaving the channels 1107. It will be recognized that in other embodiments the exposed material may be removed instead, leaving the unexposed high index material as the channels 1107.

Figure 13A:
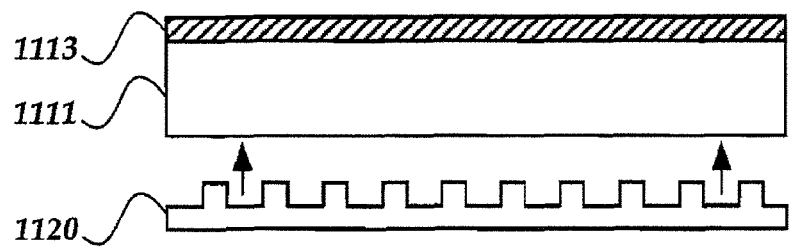
FIGS. 13A to 13C illustrate, in schematic cross-sectional views, steps in another method of forming the structure of FIG. 11.
Figure 13B:
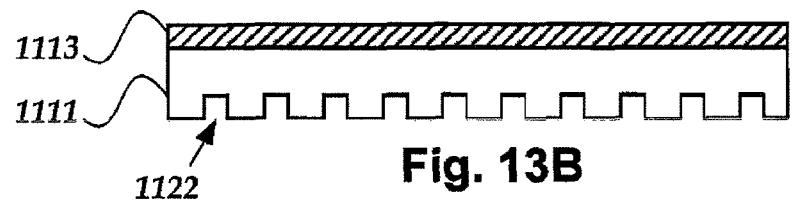
Figure 13C:
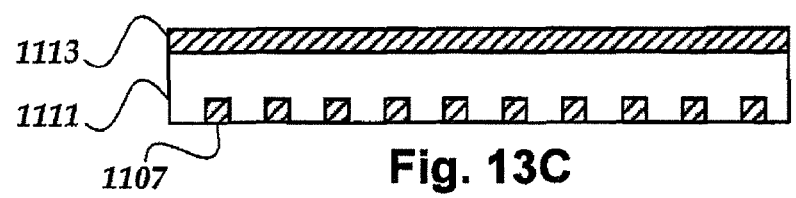

FIGS. 13A-13C illustrate another method of making the structure of FIG. 11. In this method, the light delivery element 1105 is formed on the substrate 1111 and then the opposite surface of the substrate is patterned using a tool 1120, as illustrated in FIGS. 13A and 13B. The indentations 1122 in the substrate 1111 can be filled with a material having a relatively high index of refraction to form the reflection channels 1107.

An advantage of the present fingerprint sensor is that light is used to detect the fingerprint, thereby eliminating EMI and RF interference generated by fingerprint sensors that utilize electrical signals for fingerprint detection. Moreover, the electronic components of the fingerprint sensor may be positioned well away from the ridged surface and, therefore, may be placed where there they generate less EMI or RF interference for other components.

The fingerprint sensors described above can be used alone or in conjunction with a variety of other devices including, but not limited to, computers, mobile telephones, GPS receivers, vehicles, doors, point-of-sale terminals, personal data assistants, and the like. As an example, the fingerprint sensor can be positioned near the display of a laptop computer or mobile telephone and may even use the same light source as the display. A security protocol can be implemented on any of the devices to allow functions of the device (including data) to only be accessible when the identity of the user is verified using the fingerprint sensor. It will be understood that for many devices, the security protocol may be disabled by a user.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A fingerprint sensor comprising:
   a ridged surface comprising at least one angled surface upon which a finger can be swiped and that rises to a peak;
   a plurality of spaced-apart channels, each channel configured to receive light that impinges a corresponding region of the ridged surface;
   at least one light detector configured to detect reflection of the light from the ridged surface, wherein presence of a portion of the finger against the at least one angled surface in one or more of the regions of the ridged surface below the peak alters at least one reflection characteristic of the light impinging on the one or more regions; and
   a processor configured to obtain fingerprint datapoints for the channel as the finger is swiped over the ridged surface.

2. The sensor of claim 1, wherein the ridged surface comprises at least one prism-like feature.

3. The sensor of claim 2, wherein the ridged surface comprises a plurality of prism-like features.

4. The sensor of claim 1, wherein the ridged surface comprises at least one bevel-like feature.

5. The sensor of claim 1, wherein the processor is configured to construct a fingerprint from the obtained fingerprint datapoints.

6. The sensor of claim 1, wherein the sensor comprises at least two spaced apart prism-like features that are arranged to be sequentially contacted by the finger.

7. The sensor of claim 1, wherein the plurality of channels comprises an array of waveguides.

8. The sensor of claim 1, further comprising an array of waveguides to deliver the light to impinge on the ridged surface.

9. An apparatus comprising:
   a fingerprint sensor comprising:
      a ridged surface comprising at least one angled surface upon which a finger can be swiped and that rises to a peak;
      a plurality of spaced-apart channels, each channel configured to receive light that impinges a corresponding region of the ridged surface;
      at least one light detector configured to detect reflection of the light from the ridged surface, wherein presence of a portion of the finger against the at least one angled surface in one or more of the regions of the ridged surface below the peak alters at least one reflection characteristic of the light impinging on the one or more regions; and
      a processor configured to obtain fingerprint datapoints for the channel as the finger is swiped over the ridged surface; and
   a device configured, when a security protocol is activated, to make one or more device functions accessible to a user upon verification of the user using the fingerprint sensor.

10. The apparatus of claim 9, wherein the device is a computer.

11. The apparatus of claim 9, wherein the device is a mobile phone.

12. The apparatus of claim 9, wherein the device is a vehicle.

13. The apparatus of claim 9, wherein the fingerprint sensor and the device are integrated into a single case.

14. A method of verifying identity, the method comprising:
   directing light to a ridged surface of a fingerprint sensor, the ridged surface comprising at least one angled surface upon which a finger can be swiped and that rises to a peak;
   reflecting at least a portion of the light from the ridged surface into a plurality of channels, each channel corresponding to a region of the ridged surface; and
   for each of the channels, monitoring the light reflected from the ridged surface of the fingerprint sensor to obtain a plurality of datapoints as the finger is swiped over the ridged surface, wherein presence of a portion of the finger against the at least one angled surface in one or more of the regions of the ridged surface below the peak alters at least one reflection characteristic of the light impinging on the one or more regions.

15. The method of claim 14, wherein the ridged surface of the fingerprint sensor is configured to totally internally reflect the light into the channels when the finger is not touching the ridged surface.

16. The method of claim 14, further comprising storing the datapoints as a reference fingerprint.

17. The method of claim 14, further comprising comparing the datapoints with a stored fingerprint to verify an identity of a person who swipes the finger over the ridged surface.

18. The method of claim 17, further comprising signaling to another device when the identity of the person is verified.

19. The method of claim 14, wherein monitoring the light reflected from the ridged surface of the fingerprint sensor comprises monitoring an intensity of the reflected light and assigning a value for each datapoint based on a magnitude of the monitored intensity.

20. The method of claim 14, further comprising forming an image of a fingerprint from the datapoints.

21. The fingerprint sensor of claim 1, wherein:
   the ridged surface comprises multiple angled surfaces that join at the peak;
   the ridged surface is configured to totally internally reflect the light off a first of the angled surfaces and then to totally internally reflect the light off a second of the angled surfaces when the finger is not present against the angled surfaces; and
   the ridged surface is configured to totally internally reflect the light off the first angled surface without totally internally reflecting the light off the second angled surface when the finger is present against the second angled surface.

22. The fingerprint sensor of claim 1, wherein presence of a single ridge of the finger against the at least one angled surface in the one or more regions of the ridged surface below the peak alters the at least one reflection characteristic of the light impinging on the one or more regions.

* * * * *